(12) United States Patent
Shew et al.

(10) Patent No.: US 7,736,580 B2
(45) Date of Patent: Jun. 15, 2010

(54) MAKING FOOD SERVING TRAY ASSEMBLY HAVING DISPOSAL OPENING WITH DEEP SERVING WELLS

(75) Inventors: Jerry Shew, Charlotte, NC (US); Ian D. Kovacevich, Charlotte, NC (US)

(73) Assignee: Edison Nation, LLC, Charlotte, NC (US)

( * ) Notice: Subject to any disclaimer, the term of this patent is extended or adjusted under 35 U.S.C. 154(b) by 284 days.

(21) Appl. No.: 12/028,813

(22) Filed: Feb. 10, 2008

(65) Prior Publication Data

US 2009/0091059 A1    Apr. 9, 2009

Related U.S. Application Data

(63) Continuation-in-part of application No. 29/295,757, filed on Oct. 5, 2007, now Pat. No. Des. 572,540, and a continuation-in-part of application No. 29/302,605, filed on Jan. 20, 2008, now Pat. No. Des. 572,541, and a continuation-in-part of application No. 29/302,606, filed on Jan. 20, 2008.

(51) Int. Cl.
*B29C 33/00* (2006.01)

(52) U.S. Cl. .................. 264/553; 206/561; 206/567; 264/328.1

(58) Field of Classification Search .......... 206/541, 206/561, 564, 567; 220/575; 264/553, 328.1, 264/239; 162/218
See application file for complete search history.

(56) References Cited

U.S. PATENT DOCUMENTS

| | | | |
|---|---|---|---|
| 948,434 A | 2/1910 | Scoot | |
| D67,011 S | 4/1925 | Clarke | |
| 1,768,976 A | 7/1930 | Cuthbertson | |
| 1,832,585 A | 11/1931 | Sample | |

(Continued)

FOREIGN PATENT DOCUMENTS

CA    2510098 A1    12/2006

OTHER PUBLICATIONS

Information Disclosure Statement (IDS) Letter Regarding Common Patent Application(s), submitted by Applicant on Oct. 15, 2009.

(Continued)

*Primary Examiner*—Jill L Heitbrink
(74) *Attorney, Agent, or Firm*—Tillman Wright, PLLC; Chad D. Tillman; James D. Wright

(57) ABSTRACT

A method of making a food serving tray assembly comprising the step of molding a hand portable container such that the container has a serving platter and a receptacle platter. The serving platter includes a disposal opening and serving wells for receiving food items. The receptacle platter and serving platter releasably couple to one another in a serving configuration and a transport configuration. The serving platter also has an outer peripheral wall and a plurality of dividing walls defining and separating adjacent serving wells; and the serving platter is generally received within the outer peripheral wall of the receptacle platter with the bottom of the receptacle platter and the dividing walls of the serving platter collectively isolating the wells from one another when the food serving tray assembly is in the transport configuration.

20 Claims, 5 Drawing Sheets

U.S. PATENT DOCUMENTS

| | | | |
|---|---|---|---|
| 2,034,478 A * | 3/1936 | Levy | 62/457.6 |
| 2,096,825 A * | 10/1937 | Roman | 426/114 |
| D154,224 S | 6/1949 | Tweet | |
| 2,738,915 A | 3/1956 | St. Clair | |
| 2,781,651 A | 2/1957 | Cutler | |
| D185,911 S | 8/1959 | Chadbourne et al. | |
| 2,951,610 A | 9/1960 | Smalley | |
| 3,051,346 A | 8/1962 | Grogel | |
| 3,142,409 A | 7/1964 | Ross | |
| 3,398,827 A | 8/1968 | Laskin | |
| 3,601,277 A | 8/1971 | Andrews et al. | |
| D221,883 S | 9/1971 | Cash | |
| D230,001 S | 1/1974 | Wright | |
| 3,799,386 A | 3/1974 | Madalin et al. | |
| D232,294 S | 8/1974 | Chirstian et al. | |
| 3,938,688 A | 2/1976 | Ryan | |
| 4,206,845 A | 6/1980 | Christian | |
| 4,280,336 A | 7/1981 | Taylor | |
| D285,638 S | 9/1986 | Trivison | |
| D286,360 S | 10/1986 | Trivison | |
| 4,660,716 A | 4/1987 | McMahon et al. | |
| D291,042 S | 7/1987 | Fahey et al. | |
| 4,732,274 A | 3/1988 | Bouton | |
| D295,261 S | 4/1988 | Wetter | |
| 4,838,444 A | 6/1989 | Bitel | |
| 4,874,083 A | 10/1989 | Antoni et al. | |
| D304,658 S | 11/1989 | Mattei | |
| 4,995,557 A | 2/1991 | Fremion | |
| 5,261,554 A | 11/1993 | Forbes | |
| D352,204 S | 11/1994 | Hayes et al. | |
| 5,379,934 A | 1/1995 | Lorenz | |
| D368,409 S * | 4/1996 | Schwartz | D7/553.6 |
| 5,593,062 A | 1/1997 | Martin | |
| 5,732,847 A | 3/1998 | Caldi | |
| D399,095 S | 10/1998 | Schmidt | |
| 5,869,120 A | 2/1999 | Blazevich | |
| 6,022,571 A | 2/2000 | Blazevich | |
| 6,116,455 A | 9/2000 | Rossman et al. | |
| 6,152,318 A | 11/2000 | Walker | |
| 6,168,813 B1 | 1/2001 | Blazevich | |
| D449,966 S | 11/2001 | DeMars | |
| 6,315,126 B1 | 11/2001 | Cornelissen | |
| 6,401,927 B1 | 6/2002 | Sorensen et al. | |
| D460,897 S | 7/2002 | Leuenberger | |
| D461,099 S | 8/2002 | Leuenberger | |
| 6,439,388 B1 | 8/2002 | Lerner | |
| 6,514,548 B2 | 2/2003 | Lin | |
| 6,550,630 B1 | 4/2003 | Krupa | |
| D482,283 S | 11/2003 | Wichmann et al. | |
| D489,972 S | 5/2004 | Lin | |
| D511,273 S | 11/2005 | Hadeler | |
| D516,912 S | 3/2006 | LaMasney | |
| D516,913 S | 3/2006 | LaMasney | |
| 7,083,818 B2 * | 8/2006 | Pratte | 426/394 |
| D527,954 S | 9/2006 | Roth | |
| 7,114,630 B2 | 10/2006 | Dege et al. | |
| D547,185 S | 7/2007 | Tanaka | |
| 7,326,428 B2 * | 2/2008 | Weir | 426/120 |
| D572,540 S | 7/2008 | Shew et al. | |
| D572,541 S | 7/2008 | Shew et al. | |
| D573,847 S | 7/2008 | Bizzell et al. | |
| 7,428,864 B2 * | 9/2008 | Wengrovsky | 99/646 C |
| D579,274 S | 10/2008 | Bizzell | |
| D600,499 S | 9/2009 | Bizzell et al. | |
| D600,500 S | 9/2009 | Bizzell et al. | |
| D600,501 S | 9/2009 | Bizzell et al. | |
| D609,973 S | 2/2010 | Shew et al. | |
| D611,340 S | 3/2010 | Bizzell | |
| 2005/0145638 A1 | 7/2005 | Van Handel et al. | |
| 2005/0229793 A1 | 10/2005 | Wengrovsky | |
| 2007/0062965 A1 | 3/2007 | Anderson et al. | |
| 2008/0029426 A1 | 2/2008 | Anderson et al. | |
| 2008/0029427 A1 | 2/2008 | Anderson et al. | |
| 2008/0083759 A1 | 4/2008 | Anderson et al. | |
| 2008/0083760 A1 | 4/2008 | Anderson et al. | |
| 2008/0110914 A1 | 5/2008 | Anderson et al. | |
| 2008/0121550 A1 | 5/2008 | Anderson et al. | |
| 2008/0121551 A1 | 5/2008 | Anderson et al. | |
| 2008/0121552 A1 | 5/2008 | Anderson et al. | |
| 2008/0124440 A1 | 5/2008 | Anderson et al. | |
| 2008/0128313 A1 | 6/2008 | Anderson et al. | |
| 2009/0200194 A1 | 8/2009 | Kovacevich et al. | |
| 2009/0200195 A1 | 8/2009 | Kovacevich et al. | |
| 2009/0200196 A1 | 8/2009 | Kovacevich et al. | |
| 2009/0200197 A1 | 8/2009 | Kovacevich et al. | |
| 2009/0200316 A1 | 8/2009 | Kovacevich et al. | |
| 2009/0200701 A1 | 8/2009 | Kovacevich et al. | |

OTHER PUBLICATIONS

Information Disclosure Statement (IDS) Letter Regarding Common Patent Application(s), submitted by Applicant on Mar. 30, 2010.

* cited by examiner

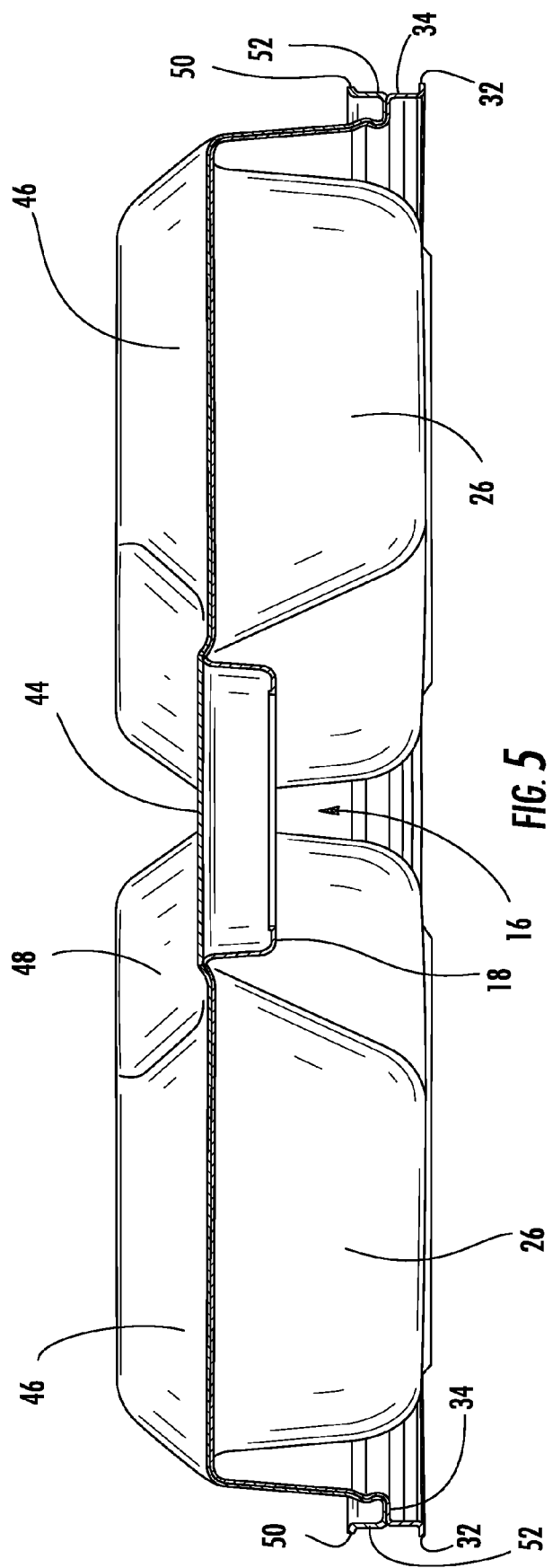

MAKING FOOD SERVING TRAY ASSEMBLY HAVING DISPOSAL OPENING WITH DEEP SERVING WELLS

CROSS-REFERENCE TO RELATED APPLICATIONS

The present application is a U.S. continuation-in-part patent application of, and claims priority under 35 U.S.C. 0120 to each of: U.S. nonprovisional patent application Ser. No. 29/295,757, filed Oct. 5, 2007, now U.S. Pat. No. Des. 572,540 which patent application is incorporated by reference herein; U.S. nonprovisional patent application Ser. No. 29/302,605, filed Jan. 20, 2008, now U.S. Pat. No. Des. 572, 541 which patent application is incorporated by reference herein; and U.S. nonprovisional patent application Ser. No. 29/302,606, filed Jan. 20, 2008, which patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Trays for snacks and appetizer-type foods are generally known. Such trays provide a place to display these foods for presentation and for eating. They also generally make it easier to transport these foods. Unfortunately, many trays do not have seating lids that enable them to serve as food containers during transport from one location to another, e.g., from a restaurant to a home. Therefore, when foods that are traditionally presented on a tray are transported from one location to another, a container other than the tray is generally used during transport.

Another problem that exists, particularly for foods such as chicken wings that create their own waste, is finding a place to put the waste prior to its being thrown away. In most cases, a trash receptacle is not located within easy reach of a table or other dining area, typically because it is unsanitary or unsightly. As such, a diner is faced with the problem of having a place to put the waste while the food creating the waste is being eaten. Generally, such waste is unappetizing and an eater would prefer to have the waste out of sight while continuing to eat.

Anderson et al. U.S. patent application Ser. No. 11/870, 538, which published as U.S. Patent Application Publication No. 2008/0029427, both of which patent references are incorporated herein by reference, address one or more of the foregoing problems. While the solutions presented therein may be suitable for their intended purposes, needs exists for alternative solutions to one or more of the foregoing problems. One or more preferred embodiments of the present invention provide such an alternative.

SUMMARY OF THE INVENTION

The present invention includes many aspects and features. In a first aspect, a food serving tray assembly includes a serving platter and a receptacle platter. The serving platter has a disposal opening extending there through and a plurality of serving wells for receiving food items therein for presentation to a person for eating. The receptacle platter has a bottom and a peripheral wall extending from the bottom at a perimeter thereof. The receptacle platter and serving platter are configured to be releasably coupled to one another in two different configurations including: a serving configuration, wherein the receptacle platter is located below the serving platter and the receptacle platter and serving platter define a substantially enclosed interior space for receiving food waste that is deposited through the disposal opening of the serving platter; and a transport configuration, wherein the receptacle platter is located above and extends over the serving platter to provide a cover for the food serving tray assembly during transport.

In connection with this aspect, the serving platter has an outer peripheral wall and a plurality of dividing walls defining and separating adjacent serving wells, each of the dividing walls extending from the disposal opening to the outer peripheral wall; and, when the food serving tray assembly is in the transport configuration, the serving platter is generally received within the outer peripheral wall of the receptacle platter and the bottom of the receptacle platter and the dividing walls of the serving platter collectively isolate the wells from one another.

In features of this aspect, the serving platter is generally rectangular; the serving platter consists of four equally dimensioned serving wells symmetrically arranged about the disposal opening of the serving platter; a top of the dividing walls is commensurate with a top of the outer peripheral wall of the serving platter, and the serving platter has an inner peripheral wall defining the disposal opening, a top of the inner peripheral wall rising above the top of the dividing walls and the top of the outer peripheral wall of the serving platter; the bottom of the receptacle platter defines a plurality of dividers, and each of the dividers of the receptacle platter aligns with and contacts a respective dividing wall of the serving platter, when the food serving tray assembly is in the transport configuration, such that the bottom of the receptacle platter and the dividing walls of the serving platter collectively isolate the wells from one another; the peripheral wall of the receptacle platter is an outer peripheral wall having a first height and each of the plurality of dividers has a second height substantially less than the first height; and/or each serving well has a bottom defining a food support surface, and the food support surface is planar and configured to be generally horizontal when the food serving tray assembly is placed on a generally horizontal surface.

In a second aspect, a food serving tray assembly includes a serving platter and a receptacle platter. The serving platter has a disposal opening extending there through and a plurality of serving wells for receiving food items therein for presentation to a person for eating. The receptacle platter has a bottom and a peripheral wall extending from the bottom at a perimeter thereof. The receptacle platter and serving platter are configured to be releasably coupled to one another in two different configurations including: a serving configuration, wherein the receptacle platter is located below the serving platter and the receptacle platter and serving platter define a substantially enclosed interior space for receiving food waste that is deposited through the disposal opening of the serving platter; and a transport configuration, wherein the receptacle platter is located above and extends over the serving platter to provide a cover for the food serving tray assembly during transport.

In connection with this aspect, the serving platter has an outer peripheral wall and a plurality of dividing walls defining and separating adjacent serving wells, each of the dividing walls extending from the disposal opening to the outer peripheral wall; and when the food serving tray assembly is in the transport configuration, the serving platter is generally received within the outer peripheral wall of the receptacle platter and each of the dividing walls of the serving platter contacts the bottom of the receptacle platter such that the receptacle platter is at least partially supported by the dividing walls.

In features of this aspect, the serving platter is generally rectangular; the serving platter consists of equally dimensioned serving wells symmetrically arranged about the disposal opening of the serving platter; a top of the dividing walls is commensurate with a top of the outer peripheral wall of the serving platter, and the serving platter having an inner peripheral wall defining the disposal opening, a top of the inner peripheral wall rising above the top of the dividing walls and the top of the outer peripheral wall of the serving platter; the bottom of the receptacle platter defines a plurality of dividers, and each of the dividers of the receptacle platter aligns with and contacts a respective dividing wall of the serving platter, when the food serving tray assembly is in the transport configuration, such that the receptacle platter is at least partially supported by the dividing walls; the peripheral wall of the receptacle platter is an outer peripheral wall having a first height and each of the plurality of dividers has a second height substantially less than the first height; and/or each serving well has a bottom defining a food support surface, and the food support surface is planar and configured to be generally horizontal when the food serving tray assembly is placed on a generally horizontal surface.

Additional aspects of the invention include methods of making and using food tray assemblies in accordance with the foregoing aspects.

In addition to the aforementioned aspects and features of the present invention, it should be noted that the present invention further encompasses the various possible combinations of such aspects and features.

BRIEF DESCRIPTION OF THE DRAWINGS

One or more preferred embodiments of the present invention now will be described in detail with reference to the accompanying drawings, wherein:

FIG. 5 is a side cross sectional view of the food serving tray assembly taken along the lines 5-5 of FIG. 3.

DETAILED DESCRIPTION

Figure 1:
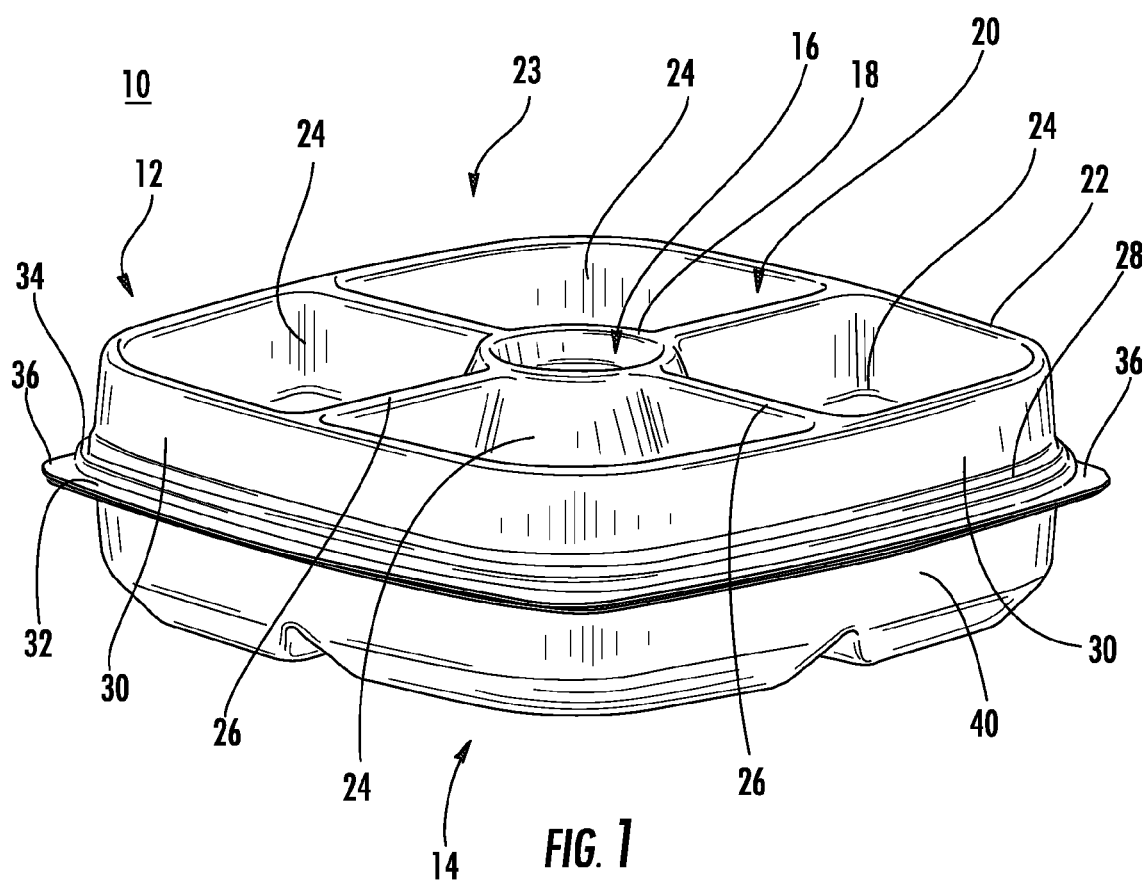
FIG. 1 is a perspective view of a food serving tray assembly, shown in a serving configuration, in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its applications, or uses.

FIG. 1 is a perspective view of a food serving tray assembly 10, shown in a serving configuration, in accordance with a preferred embodiment of the present invention. The food serving tray assembly 10 includes a serving platter 12 and a receptacle platter 14 that may be releasably coupled to each other in a plurality of ways, such as those described herein below, so as to define at least two different configurations of the food serving tray assembly 10., i.e., a serving configuration and a transport (and/or storage) configuration. In this respect, the food serving tray assembly 10 is shown in the serving configuration in FIG. 1, wherein the serving platter 12 is coupled to and extends over and covers the top of the receptacle platter 14.

The food serving tray assembly 10 may be used to serve and transport food items, particularly appetizer-type food items that create their own waste, naturally or otherwise. An example of such a food item is chicken wings. Additional food items may include tail-on shrimp, ribs, or food items for which toothpicks are to be utilized as an assembly toot or utensil, such as meatballs.

Figure 2:
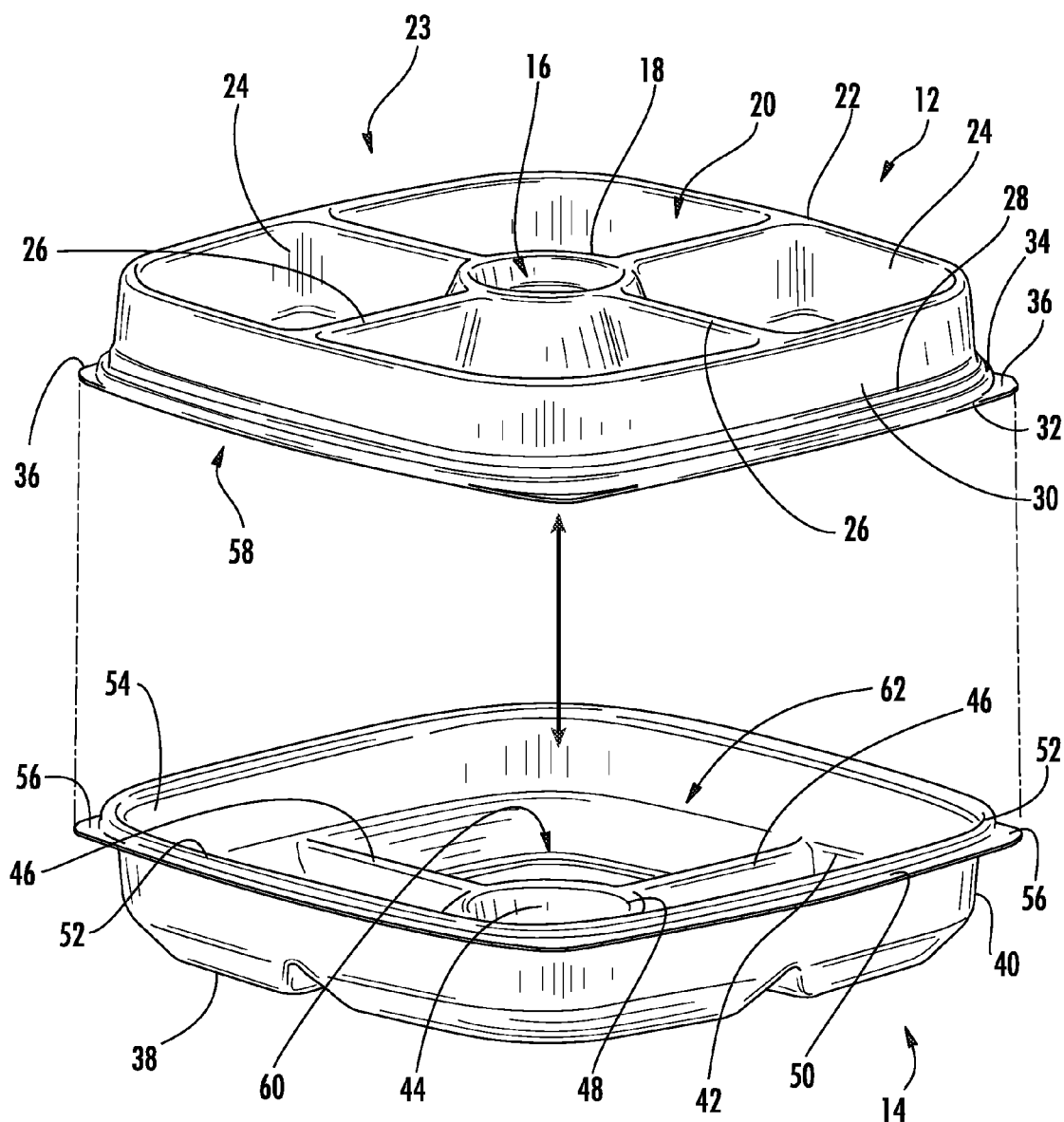
FIG. 2 is a perspective view of a serving platter and a receptacle platter of the food serving tray assembly of FIG. 1, shown separated from one another in transitioning to or from the serving configuration.

FIG. 2 is a perspective view of the food serving tray assembly 10, with the serving platter 12 and the receptacle platter 14 separated from one another in transitioning of the food serving tray assembly 10 to or from the serving configuration. The serving platter 12 in at least one preferred embodiment is generally rectangular and has a disposal opening 16 extending there through as defined by a surrounding inner peripheral wall 18.

The serving platter 12 also has a serving area 20 defined between the inner peripheral wall 18 and an outer peripheral wall 22 of the serving platter 12. The serving area 20 is located on the serving side 23 of the serving platter 12. The serving platter 12 further includes a rim 30, including a flat, horizontally-extending lip 32, around the outer peripheral wall 22. At the corners of the serving platter 12, the lip 32 extends an additional distance beyond the outer peripheral wall 22 to form a plurality of separation tabs 36. Above the lip 32 is arranged a raised portion 34, and above the raised portion 34 are arranged a generally evenly-spaced set of ridges 28 (not numbered but visible in cross-section in FIG. 5) that extend outwardly from the exterior surface of the outer peripheral wall 22.

The serving area 20 includes a plurality of wells 24 with a dividing wall 26 disposed between each pair of adjacent wells 24. The wells 24 start at the inner peripheral wall is of the disposal opening 16 and terminate at the outer peripheral wall 22 of the serving platter 12. It is preferred that each well 24 be capable of receiving therein a plurality of a particular food item, such as ten chicken wings, in such a way as to prevent food in one well 24 from inadvertently coming into contact with food in another well 24. It is also preferred that the wells 24 collectively encompass substantially the entire serving area 20.

Each of the wells 24 is approximately as deep as the height of the outer peripheral wall 22, and the well-dividing walls 26 are approximately the same height as the outer peripheral wall 22. In at least some embodiments, the top of the inner peripheral wall 18 that defines the disposal opening 16 is commensurate with the top of the dividing walls 26 and with the top of the outer peripheral wall 22. In other embodiments, the top of the dividing walls 26 is commensurate with the top of the outer peripheral wall 22 of the serving platter 12, but the top of the inner peripheral wall 18 that defines the disposal opening 16 lies at least slightly above the top of the dividing walls 26 and the top of the outer peripheral wall 22. In these embodiments, the portion of the inner peripheral wall 18S defining the disposal opening 16 that rises above the top of the dividing walls 26 preferably is conical.

In the preferred embodiment, the serving platter 12 includes four equally sized wells 24 and the serving area 20 is radially symmetrical relative to the disposal opening 16. In addition, it is contemplated that different wells 24 may hold differing kinds of food items, e.g., two wells 24 may hold chicken wings, one well 24 may hold celery, and another well 24 may hold carrots. It is also contemplated that different wells 24 may hold similar food items that have been prepared differently or prepared with different kinds of sauces, e.g., one well 24 may hold chicken wings prepared with mild sauce, one well 24 may hold chicken wings prepared with medium sauce, one well 24 may hold chicken wings prepared with hot sauce, and another well 24 may hold chicken wings prepared with no sauce.

When disposed in the orientation shown in FIGS. 1 and 2, the receptacle platter 14 has a generally planar (but locally contoured) bottom 38 and an outer peripheral wall 40 extending from the bottom 38 along a perimeter 42 thereof. The bottom 38 of the receptacle platter 14 includes a generally circular raised platform 44 in the center thereof and a plurality of dividers 46 radially extending from the central raised platform 44 and disposed in locations that correspond to and align with the locations of the dividing walls 26 of the serving platter 12 when the food serving tray assembly is in the serving and transport configurations. The raised platform 44 has an inner peripheral wall 48 having a height that is less than the height of the outer peripheral wall 40 of the receptacle platter 14. Moreover, in at least some embodiments, the height of the inner peripheral wall 48 is approximately the same as the height of each of the dividers 46.

The receptacle platter 14 further includes a rim 54, including a flat, horizontally-extending lip 50, around the outer peripheral wall 40. At the corners of the receptacle platter 14, the lip 50 extends an additional distance beyond the outer peripheral wall 40 to form a plurality of separation tabs 56. Above the rim 54 is arranged a raised portion 52, and on the inside of the raised portion 52 is arranged an inwardly-facing groove-and-ridge arrangement (not numbered but visible in cross-section in FIG. 5). The elements of the rim 54 of the receptacle platter 14 are sized and arranged to interact with elements of the rim 30 of the serving platter 12 as described hereinbelow.

As stated previously, the food serving tray assembly 10 is shown in a serving configuration in FIG. 1. This configuration is defined by the receptacle platter 14 being coupled to and located below the serving platter 12 relative to a surface, such as a table or counter, on which the food serving tray assembly 10 is normally placed for serving of food from the tray assembly 10. In this configuration, an underside 58 of the serving platter 12 is disposed in opposing facing relation with an interior bottom surface or side 60 of the receptacle platter 14. Thus, in the serving configuration, a substantially enclosed interior space 62 (illustrated in FIG. 2) is thereby defined between the underside 58 of the serving platter 12 and the interior bottom surface 60 of the receptacle platter 14.

Figure 3:
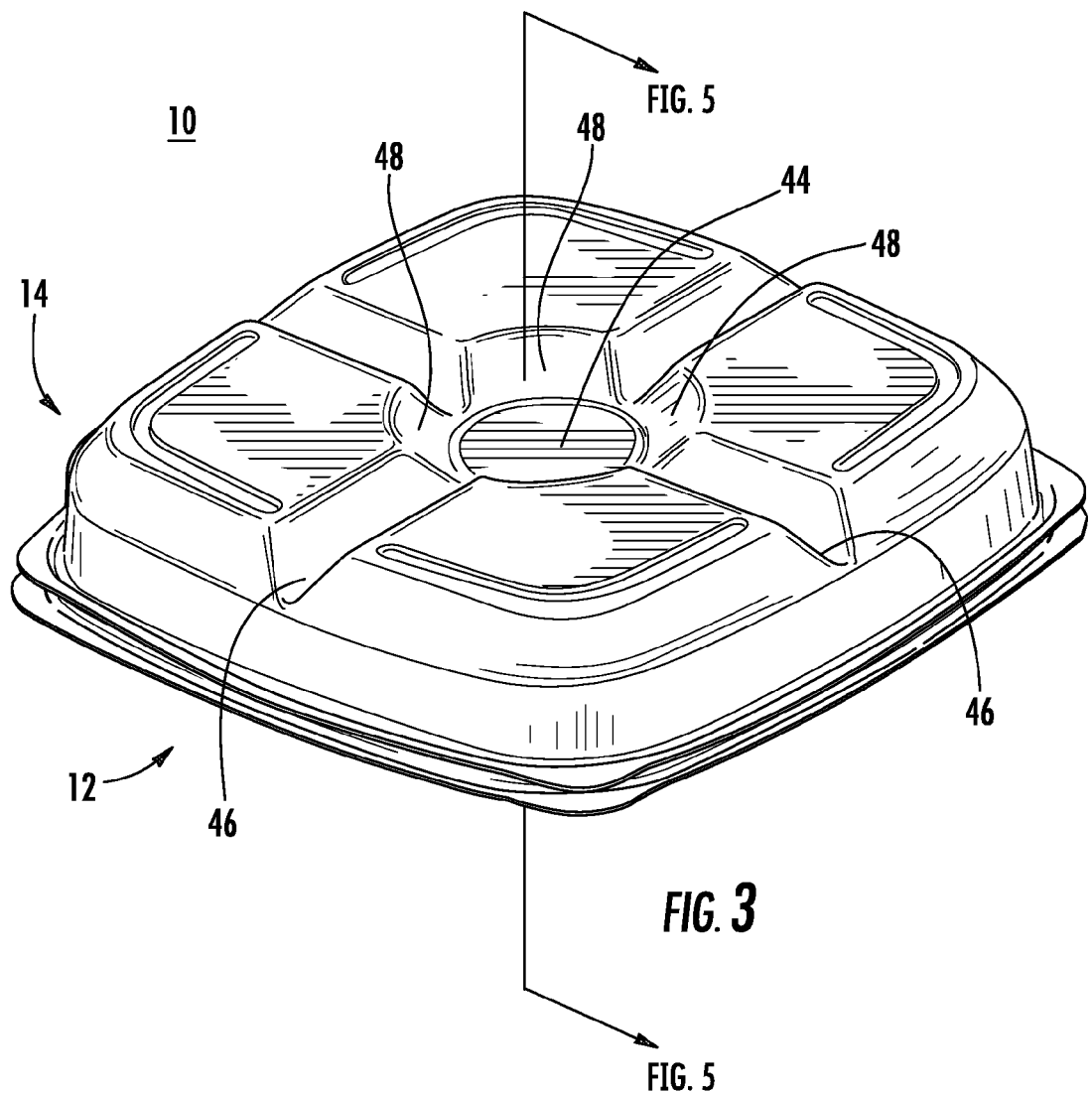
FIG. 3 is a perspective view of the food serving tray assembly of FIG. 1, shown in a transport configuration wherein the food serving tray assembly has been converted into a food container for transport and storage.
Figure 4:
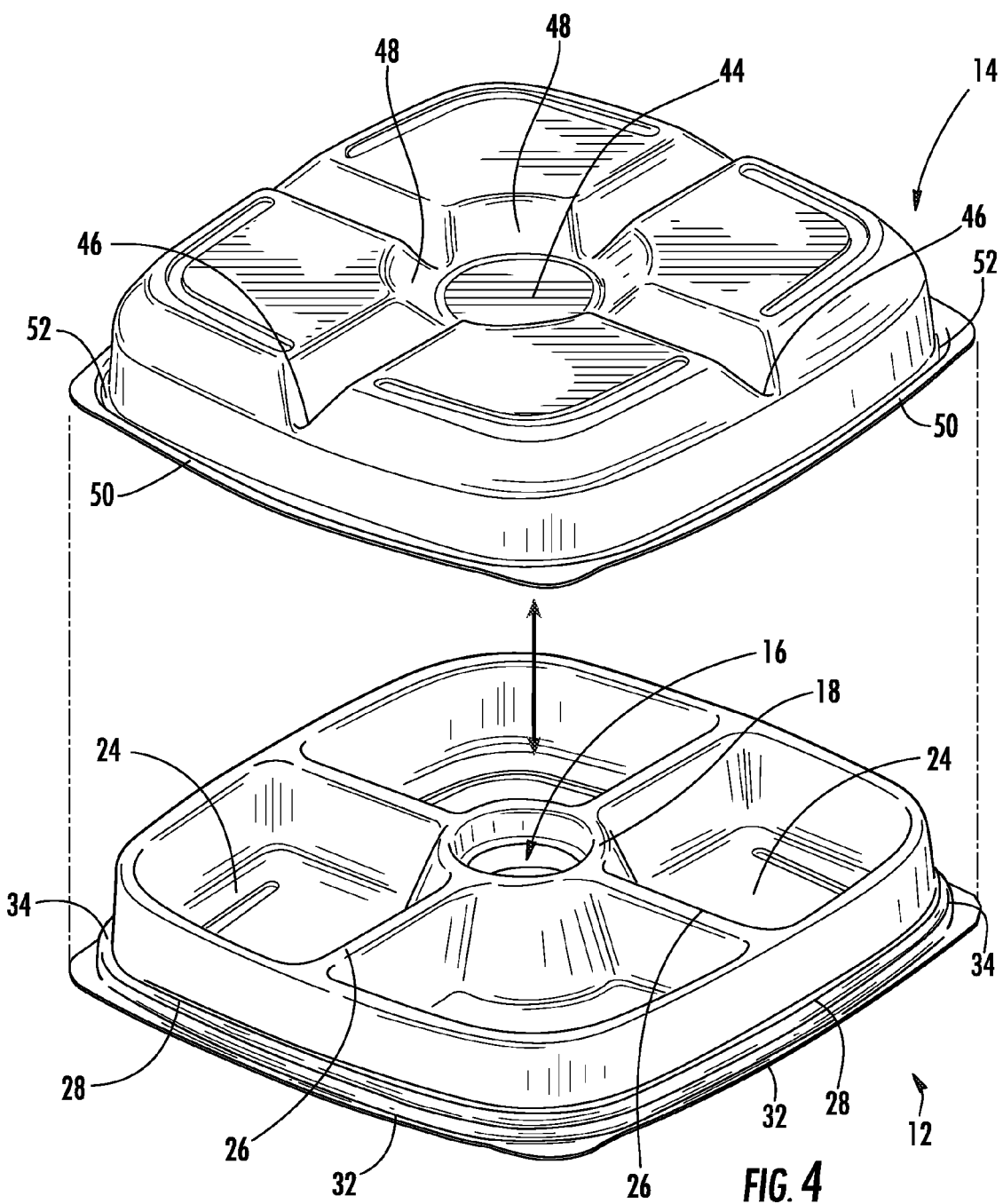
FIG. 4 is a perspective view of the serving platter and the receptacle platter of the food serving tray assembly of FIG. 3, shown separated from one another in transitioning to or from the transport configuration.

During transport of the food serving tray assembly 10 from one location to another, the food serving tray assembly 10 preferably is configured differently. In this regard, FIG. 3 shows the food serving tray assembly 10 in a transport configuration, and FIG. 4 shows the serving platter 12 and receptacle platter 14 separated from one another in transitioning to or from the transport configuration. In the transport configuration, the receptacle platter 14 has been flipped upside down (relative to its orientation in the serving configuration) and placed over the serving platter 12 in covering relation thereto. In this configuration, the food serving tray assembly 10 serves as a food container. More particularly, the receptacle platter 14 becomes a cover for the serving platter 12, such that food items disposed on the serving platter 12 are covered and protected from the environment and from being spitted during transport and/or storage. In at least one preferred commercial embodiment, the receptacle platter 14 is at least partially fabricated of a translucent or transparent material so that food items carried on the serving platter 12 may be at least partially viewed through the receptacle platter 14 during transport. More particularly, the serving area 20 (not numbered in FIG. 3 or 4, but identified in FIG. 1) is viewable through at least the top of the receptacle platter 14 when the food serving tray assembly 10 is in the transport configuration. On the other hand, it may be preferable for the sides of the receptacle platter 14 to be opaque such that waste received in the interior space 62 (as described hereinbelow) is not viewable when the food serving tray assembly 10 is in the serving configuration. Furthermore, though not required, in at least one preferred commercial embodiment the serving platter 12 is neither translucent nor transparent.

FIG. 5 is a side cross sectional view of the food serving tray assembly 10, in its transport configuration, taken along lines 5-5 of FIG. 3. In the transport configuration, the central raised platform 44 and the dividers 46 of the receptacle platter 14 provide an additional stabilizing structure for the food serving tray assembly 10. More particularly, when the food serving tray assembly 10 is in the transport configuration as shown in FIG. 5, the receptacle platter 14 is in its inverted orientation, and the peripheral wall 48 of the central raised platform 44 is supported by the inner peripheral wall 18 of the disposal opening 16 and the dividers 46 are supported by the dividing walls 26 of the serving platter 12. Such additional support provides a food serving tray assembly 10 that is relatively more stable during transport.

Further, and as is illustrated in FIG. 5, the disposal opening 16 of the serving platter 12 is covered and sealed off by the central raised platform 44 of the receptacle platter 14 when the food serving tray assembly 10 is in the transport configuration. As such, the central raised platform 44 keeps environmental contaminants from entering the serving area through the disposal opening 16 of the serving platter 12 and contaminating food items arranged in the serving area 20 during transport. Additionally, because the dividing walls 26 of the serving platter 12 are engaged by the dividers 46 of the receptacle platter 14 when the food serving tray assembly 10 is in the transport configuration, the dividers 46 ensure that food items from one well 24 do not come into contact with food items in another well 24 during transport.

As will now be apparent, the serving platter 12 and receptacle platter 14 are releasably coupled together in the serving configuration and in transport configuration. To achieve the serving configuration, the raised portion 52 of the lip 50 of the receptacle platter 14 is releasably coupled within the raised portion 34 of the lip 32 of the serving platter 12, as shown in FIG. 1. The two raised portions 34,52 are configured to releasably couple to one another in a frictional fit. Although not illustrated, the frictional fit may be enhanced by grooves, recesses, indentations, ridges and the like on the respective raised portions 34,52. The separation tabs 36,56 on the respective components aid in separating the components from one another.

To achieve the transport configuration, the ridges 28 of the rim 30 of the serving platter 12 are releasably coupled with the groove-and-ridge arrangement on the inside of the raised portion 52 of the rim 54 of the receptacle platter 14, as shown in FIG. 1. The ridges 28 of the serving platter rim 30 and the groove-and-ridge arrangement on the inside of the raised portion 52 of the receptacle platter 14 are configured to releasably couple to one another in a frictional fit.

To achieve the transport configuration, the receptacle platter is inverted and the ridges 28 of the rim 30 of the serving platter 12 are releasably coupled with the groove-and-ridge arrangement on the inside of the raised portion 52 of the rim 54 of the receptacle platter 14, as shown in FIG. 1. More particularly, the raised portion 52 of the lip 50 of the receptacle platter 14 fits in abutting relation upon the raised portion 34 of the lip 32 of the serving platter 12, and the ridge 28 above the raised portion 34 of the serving platter 12 fits within the groove on the inside of the raised portion 52 of the lip 50 of the receptacle platter 14, thereby holding the receptacle platter 14 in place with a frictional fit.

For purposes of storage, shipping or the like, the serving platter 12 and receptacle platter 14 also are preferably designed for nesting in respective serving platters 12 and receptacle platters 14 with a preferred nesting allowance of about a quarter of an inch.

In use, the serving platter 12 is first loaded with the desired food items, e.g., chicken wings, typically in a kitchen or other food preparation area of a restaurant or the like, by placing the food items in the wells 24 thereof. The receptacle platter 14 is then inverted and coupled to the top of the serving platter 12 in the transport configuration described previously so that the food serving tray assembly 10 may be transported to the dining area, which may be a table in a restaurant, a consumer's own kitchen at home, or any other location at which food may be consumed. Because at least a portion of the receptacle platter 14 is preferably translucent or transparent, a server or customer—as the case may be—will be able to see the food items carried on the serving platter 12 during transport. This may be particularly advantageous in the food service industry for the situation wherein users are take-out customers. The customer will be able to view his order to make sure that it is accurate without having to open the food container defined by the food serving tray assembly 10.

At the dining area, the food serving tray assembly 10 may be prepared for use as follows. First, the receptacle platter 14 may be separated from the serving platter 12 by a waitperson, a diner, or the like. After being decoupled from the serving platter 12, the receptacle platter 14 is turned over and coupled again to the serving platter 12, but this time the receptacle platter 14 is located below the serving platter 12 rather than over the top of the serving platter 12, as described previously. Then, as a piece of food is eaten, any food waste created by the food item, e.g., chicken wing bones, may be discarded by dropping the waste through the disposal opening 16 of the serving platter 12 for receipt into the substantially enclosed interior space 62 defined by the coupling of the serving platter 12 and receptacle platter 14 in the serving configuration.

In the chicken wing example, this allows a user to eat chicken wings located on the serving platter 12 and easily and neatly discard the bones through the disposal opening 16 of the serving platter 12. The bones are collected in the receptacle platter 14, which is attached to the serving platter 12. As such, the bones are neatly contained within the receptacle platter 14 while the chicken wings are being eaten. When a user has finished eating the chicken wings, he is left with an eating area free of unsightly, messy bones. Further, the bones may be easily removed from the area by removing the entire tray assembly 10.

The bones may be disposed of in a waste receptacle in one of at least two ways. If the food serving tray assembly 10 is of a durable, reusable variety, the bones may be disposed of by decoupling the serving platter 12 from the receptacle platter 14 and throwing the bones in a waste receptacle. A person transferring the bones to the waste receptacle does not ever have to come into contact with the discarded bones. This may be particularly advantageous in situations wherein the person disposing of the bones is not the same person that ate the chicken wings. On the other hand, if the food serving tray assembly 10 is of a nondurable, disposable variety, the entire assembly 10 may be simply thrown into the waste receptacle without decoupling of the serving and receptacle platters 12,14.

If the food serving tray assembly 10 itself is to be disposable and, thus, intended only for single use, then the serving platter 12 and receptacle platter 14 may be fabricated from a variety of thermoplastic materials. Examples include polypropylene, polystyrene and polyethylene terephthalate (PET). They are preferably fabricated of vacuum formed polypropylene. Vacuum forming lends itself to forming relatively flexible components, and the components are well suited to being disposed of after a single use or limited number of uses. Alternatively, the serving platter 12 may be manufactured in a pulp molding process or in some other inexpensive manufacturing process. Pulp molding products are well known and include audio speaker cones and egg cartons. Pulp molding further enables low cost, three-dimensional branding as a result of the ability to selectively raise portions of the surface during the pulp molding.

A disposable tray assembly may be preferred for take-out customers of the food service industry. With the tray assembly 10 of the present invention, a customer is able to order a food item that is typically served in a restaurant on a serving platter and is able to eat the particular food item as he would eat it in the restaurant, i.e., on a serving platter. In addition, the customer is able to enjoy the benefit of discarding waste in the tray assembly's disposal space 62 and is then able to dispose of the entire tray assembly after use.

It is also contemplated that a tray assembly 10 may be comprised of a more durable material and therefore may be particularly suitable for repeated use. In a more durable embodiment, the serving platter 12 and receptacle platter 14 are preferably relatively more long lasting and rigid and are formed in one or more molding processes. The molding processes may include injection molding, rotational molding, and/or blow molding. In this embodiment, it is further preferred that the serving platter and receptacle platter are injection molded polypropylene.

The more durable, rigid serving platter 12 and receptacle platter 14 will form a tray assembly 10 that is preferably a washable embodiment of the present invention. Because of the sturdy construction, the tray assembly 10 may be used multiple times with washings between uses. As such, this embodiment may be preferred for commercial food service establishments, such as restaurants, to be used by dine-in customers.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of making a food serving tray assembly comprising the step of molding a hand portable container such that the container has a serving platter having a disposal opening extending there through and having a plurality of serving wells for receiving food items therein for presentation to a person for eating, and a receptacle platter having a bottom and a peripheral wall extending from the bottom at a perimeter thereof, (a) wherein the receptacle platter and serving platter are configured to be releasably coupled to one another in two different configurations including,
      (i) a serving configuration, wherein the receptacle platter is located below the serving platter and the receptacle platter and serving platter define a substantially enclosed interior space for receiving food waste that is deposited through the disposal opening of the serving platter, and
      (ii) a transport configuration, wherein the receptacle platter is located above and extends over the serving platter to provide a lid for the food serving tray assembly during transport;
   (b) the serving platter having an outer peripheral wall and a plurality of dividing walls defining and separating adjacent serving wells, each of the dividing walls extending from the disposal opening to the outer peripheral wall;
   (c) wherein, when the food serving tray assembly is in the transport configuration, the serving platter is generally received within the outer peripheral wall of the receptacle platter and the bottom of the receptacle platter and the dividing walls of the serving platter collectively isolate the wells from one another.

2. The method of claim 1, wherein the serving platter is generally rectangular.

3. The method of claim 1, wherein the serving platter consists of four serving wells.

4. The method of claim 1, wherein the serving platter consists of four equally dimensioned serving wells symmetrically arranged about the disposal opening of the serving platter.

5. The method of claim 1, wherein a top of the dividing walls is commensurate with a top of the outer peripheral wall of the serving platter, and wherein the serving platter having an inner peripheral wall defining the disposal opening, a top of the inner peripheral wall rising above the top of the dividing walls and the top of the outer peripheral wall of the serving platter.

6. The method of claim 1, wherein the bottom of the receptacle platter defines a plurality of dividers, and wherein each of the dividers of the receptacle platter aligns with and contacts a respective dividing wall of the serving platter, when the food serving tray assembly is in the transport configuration, such that the bottom of the receptacle platter and the dividing walls of the serving platter collectively isolate the wells from one another.

7. The method of claim 6, wherein the peripheral wall of the receptacle platter is an outer peripheral wall having a first height and each of the plurality of dividers has a second height substantially less than the first height.

8. The method of claim 1, wherein each serving well has a bottom defining a food support surface, and wherein the food support surface is planar and configured to be generally horizontal when the food serving tray assembly is placed on a generally horizontal surface.

9. The method of claim 1, wherein the disposal opening is centrally located relative to the serving platter and comprises a generally rounded aperture.

10. A method of making a food serving tray assembly comprising the step of molding a hand portable container such that the container has a serving platter having a disposal opening extending there through and having a plurality of serving wells for receiving food items therein for presentation to a person for eating, and a receptacle platter having a bottom and a peripheral wall extending from the bottom at a perimeter thereof,
(a) wherein the receptacle platter and serving platter are configured to be releasably coupled to one another in two different configurations including,
(i) a serving configuration, wherein the receptacle platter is located below the serving platter and the receptacle platter and serving platter define a substantially enclosed interior space for receiving food waste that is deposited through the disposal opening of the serving platter, and
(ii) a transport configuration, wherein the receptacle platter is located above and extends over the serving platter to provide a lid for the food serving tray assembly during transport;
(b) the serving platter having an outer peripheral wall and a plurality of dividing walls defining and separating adjacent serving wells, each of the dividing walls extending from the disposal opening to the outer peripheral wall;
(c) wherein, when the food serving tray assembly is in the transport configuration, the serving platter is generally received within the outer peripheral wall of the receptacle platter and each of the dividing walls of the serving platter contacts the bottom of the receptacle platter such that the receptacle platter is at least partially supported by the dividing walls.

11. The method of claim 10, wherein the serving platter is generally rectangular.

12. The method of claim 10, wherein the serving platter consists of four serving wells.

13. The method of claim 10, wherein the serving platter consists of four equally dimensioned serving wells symmetrically arranged about the disposal opening of the serving platter.

14. The method of claim 10, wherein a top of the dividing walls is commensurate with a top of the outer peripheral wall of the serving platter, and wherein the serving platter having an inner peripheral wall defining the disposal opening, a top of the inner peripheral wall rising above the top of the dividing walls and the top of the outer peripheral wall of the serving platter.

15. The method of claim 10, wherein the bottom of the receptacle platter defines a plurality of dividers, and wherein each of the dividers of the receptacle platter aligns with and contacts a respective dividing wall of the serving platter, when the food serving tray assembly is in the transport configuration, such that the receptacle platter is at least partially supported by the dividing walls.

16. The method of claim 15, wherein the peripheral wall of the receptacle platter is an outer peripheral wall having a first height and each of the plurality of dividers has a second height substantially less than the first height.

17. The method of claim 10, wherein each serving well has a bottom defining a food support surface, and wherein the food support surface is planar and configured to be generally horizontal when the food serving tray assembly is placed on a generally horizontal surface.

18. The method of claim 10, wherein the disposal opening is centrally located relative to the serving platter and comprises a generally rounded aperture.

19. A method of making a food serving tray assembly comprising the step of molding a hand portable container such that the container has a serving platter having a disposal opening extending there through and having a plurality of serving wells for receiving food items therein for presentation to a person for eating, and a receptacle platter having a bottom and a peripheral wall extending from the bottom at a perimeter thereof,
(a) wherein the receptacle platter and serving platter are configured to be releasably coupled to one another in two different configurations including,
(i) a serving configuration, wherein the receptacle platter is located below the serving platter and the receptacle platter and serving platter define a substantially enclosed interior space for receiving food waste that is deposited through the disposal opening of the serving platter, and
(ii) a transport configuration, wherein the receptacle platter is located above and extends over the serving platter to provide a lid for the food serving tray assembly during transport;
(b) the serving platter having an outer peripheral wall and a plurality of dividing walls defining and separating adjacent serving wells, each of the dividing walls extending from the disposal opening to the outer peripheral wall;
(c) wherein, when the food serving tray assembly is in the transport configuration,
(i) the serving platter is generally received within the outer peripheral wall of the receptacle platter,
(ii) the bottom of the receptacle platter and the dividing walls of the serving platter collectively isolate the serving wells from one another, and
(iii) each of the dividing walls of the serving platter contacts the bottom of the receptacle platter such that the receptacle platter is at least partially supported by the dividing walls.

20. The method of claim 19, wherein the disposal opening is centrally located relative to the serving platter and comprises a generally rounded aperture.

* * * * *